United States Patent

[11] 3,582,818

[72] Inventor Joseph Rudolph
 Augsburg, Germany
[21] Appl. No. 807,206
[22] Filed Mar. 14, 1969
[45] Patented June 1, 1971
[73] Assignee Patent-Treuhand-Gesellschaft Fur
 Elektrische-Gluhlampen mbH
[32] Priority Mar. 21, 1968
[33] Germany
[31] P 17 64 006.1

[54] GAS LASER HAVING THE DISCHARGE TUBE
 CONNECTION TO THE CATHODE BY A CONDUIT
 WITH A CONSTRICTIVE ORIFICE
 5 Claims, 2 Drawing Figs.
[52] U.S. Cl............................................................ 331/94.5
[51] Int. Cl........................................................... H01s 3/02
[50] Field of Search............................................. 331/94.5

[56] References Cited
 UNITED STATES PATENTS
 3,390,297 6/1968 Vollmer ..................... 331/94.5UX
 3,470,494 9/1969 Neusel........................ 331/94.5
 3,486,058 12/1969 Hernquist.................... 331/94.5X FOREIGN PATENTS
1,487,802 7/1967 France ....................... 331/94.5

Primary Examiner—Ronald L. Wibert
Assistant Examiner—Edward S. Bauer
Attorney—Howard P. King ABSTRACT: A gas laser comprising a long straight capillary discharge tube with adjoining laterally offset electrode chambers approximate to the sides of said tube at opposite end regions thereof. Said discharge tube has transverse end closures, constituted to function as mirrors or as windows. The windows being inclined at the Brewster angle. Said tube is connected proximate to its ends to the respective adjoining electrode chambers by a divertive conduit whereof one end of each opens into said discharge tube, and whereof the other end of each conduit provides passageway connection to the respective electrode chamber. At least with respect to connection with the cathode chamber, said conduit extends coaxially for a distance thereinto and has an orifice opening into said chamber at a distance from place of entry of said conduit into the chamber. In one form of the physical embodiment of the invention, said orifice enters longitudinally of the end of the conduit, whereas in the preferred form the end of the conduit projecting into said chamber is closed, and the orifice opens at the side thereof near to the closed end of the conduit.

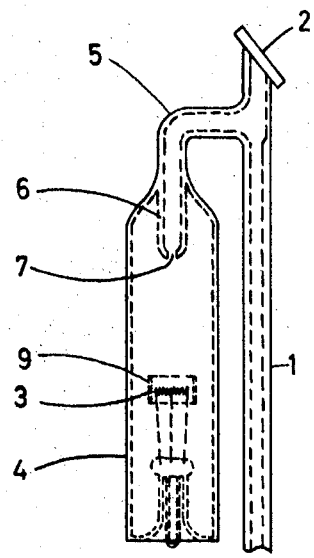
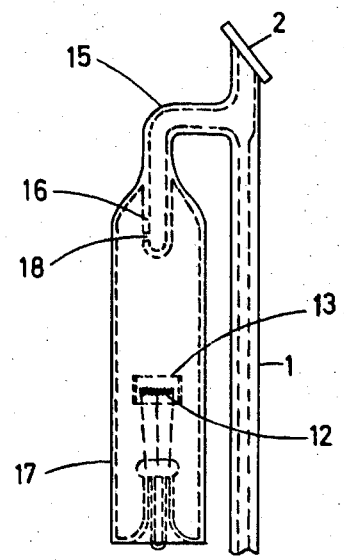
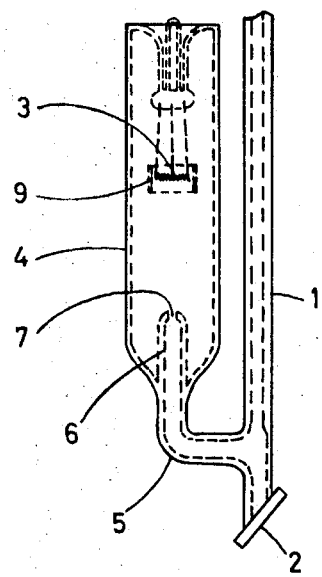
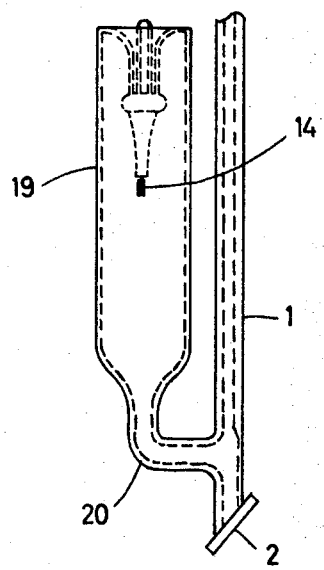
FIG. 1      FIG. 2
Joseph Rudolph
INVENTOR
BY Howard P. King
ATTORNEY

GAS LASER HAVING THE DISCHARGE TUBE CONNECTION TO THE CATHODE BY A CONDUIT WITH A CONSTRICTIVE ORIFICE

THE PROBLEM

In prior art lasers, minute particles of the emitter oxide, often hardly perceptible to the human eye, escaping from the cathode during transfer or during long burning periods, as a consequence of thermal stress, reach the windows or mirrors and lead to a decrease of radiation output of the laser. It is a fact and can be demonstrated that the monomode operation of the laser may be quickly and completely suppressed by a few minute particles on one of the window or mirror closures. A second interference effect experienced in the prior art, occurring sequentially to a long burning period a coating is formed as a result of the evaporation of the cathode material, especially at acute angle bends in the discharge path. Such coatings deposit also at the opening of the passageway from the cathode into the capillary discharge tube and effect contamination of the closures comprising the windows or mirrors. It is the object of the invention to provide a construction wherein the above-mentioned difficulties with prior art lasers are overcome.

More specifically, the invention proposes a construction involving a minimum of contamination in operation. The invention successfully deters contaminating particles from reaching the closures of the resonant chamber.

THE DRAWING

Referring to the accompanying drawing, in which like numerals of reference indicate identical parts in both views;

FIG. 1 shows an embodiment of a gas laser for AC operation in compliance with the invention; and FIG. 2 shows another embodiment of the invention for DC operation.

In each embodiment illustrated, two electrodes are present. In the form of FIG. 1 for AC operation, both of the electrodes are alike and of emitting or cathode type; whereas in FIG. 2 for DC operation, one electrode is a heated cathode but the other one need not be heated and may simply be an anode consisting of a metal rod as is usual in the art.

DESCRIPTION

In its general aspect, the construction of laser herein illustrated, comprises a long thin capillary discharge tube 1, having end closures 2 inclined at the Brewster angle or end closures functioning as mirrors of which at least one is partially transmissive. At the side of said capillary discharge tube, exterior thereto and proximate to the end regions thereof, are appendages which comprise electrode chambers offset from and in parallelism with the tube and each connected to the tube in the vicinity of said end closures by an elbow conduit. Said tube and the chambers and conduits are constructed of soft glass.

According to the showing in FIG. 1, the two electrodes 3 are both of electron emissive heated cathode-type individually mounted in respective chambers 4 which are offset from and in parallelism to said discharge tube 1 and proximate to opposite end regions of said tube. Each chamber 4 is supported from said tube 1 by a conduit 5 having an elbow shape providing a passageway from near the end of said tube into the electrode chamber, thereby establishing a right-angle diversion in the passageway from the interior of said chamber to the interior of said tube and where entering the tube is likewise transverse to the axis thereof again creating diversion in the electron path. The end portion 6 of the elbow conduit sealed to the electrode chamber at an end of said chamber, projects for a considerable distance coaxially into said chamber, and in this instance is shown as having an end orifice 7 opening toward the cathode 3. It is to be understood, however, that the orifice may be provided, as with orifice 18 in FIG. 2, at the side of said conduit next to the inner end of the conduit instead of through the longitudinal end of said conduit. A side opening for the orifice, which is a preferred construction, establishes once again a diversion of flow path, all such diversions aiding in interrupting and stopping transit of particles from the cathode to the capillary discharge tube and to the closures or mirrors thereof. It is also desirable to physically shield the cathode as with an annular cap 9 to thereby interpose an initial deterrent to direct travel of particles from the cathode to the conduit.

Dimensionally considered, the discharge tube 1 may be between 10 and 200 centimeters in length, may desirably be chosen as 40 centimeters as a specific instance by way of example. Correspondingly the inside diameter has a range of 1 to 6 millimeters. The passageway in the conduit 5 has an inner diameter from 2 to 8 millimeters and in the selected example 6 millimeters would be appropriate. The orifice 7 (or 18 in FIG. 2) should be commensurate with the inside diameter of the discharge tube, so in the selected example would be substantially 2 millimeters. The smaller the diameter of the orifice, the less is the danger that the liberated oxide particles from the cathode will reach the discharge tube windows or closures 2. Care has to be taken that the orifice or constriction is not too small in order to avoid an unnecessary increase in the starting and burning voltage. In any case, the size of the orifice should not be much smaller than the diameter of the discharge tube capillary. If the orifice has approximately the same diameter as the inside of the discharge tube, the windows will, as a consequence, be protected to a large extent from the oxide particles without entailing increase in the starting or burning voltage. The conduit projects into the electrode chamber in the range of 2 to 3 centimeters with distance of 2 centimeters being satisfactory for the given example.

The volume of the electrode chamber 4 is rated so that gas absorption during operation of the gas laser is substantially compensated, and a long and useful life is obtained. Consistent with the above-cited example, a length of 15 centimeters and diameter of 20 millimeters will be found agreeable. The gas employed may be a well-known mixture of helium and neon or other gases. The two electrodes in FIG. 1 function alternately as cathodes and as anodes in their use with alternating current.

In FIG. 2, the structure is arranged for use with direct current, and one appendage includes a cathode whereas the other one provides an electrode that is strictly an anode. The cathode appendage of FIG. 2 conforms in most respects to the corresponding part of FIG. 1. Briefly it may be said that the cathode appendage of FIG. 2 includes a heated cathode 12 with an annular shield 13 therearound. An elbow conduit 15 has one end portion 16 thereof extending coaxially into cathode chamber 17, and next to its innermost end has an orifice 18 which, as preferred construction, opens laterally at the side of said conduit. Dimensions and their details explained above with respect to FIG. 1, in regard to the cathode appendage, its chamber, conduit, cathode and gas, except for the difference in location of the orifice, apply equally to the construction, use and advantages of FIG. 2.

Since the FIG. 2 construction is for use with DC current, a hot emitting anode is not required. The anode 14 accordingly is an appropriate metal rod sealed within electrode chamber 19. A difference from FIG. 1 may also be noted in that the elbow conduit 20 for the anode chamber 19 does not have to project thereinto, so ends where it meets said chamber and is sealed thereto in communication with the interior thereof and at its other end supported by, sealed to and communicating with the capillary discharge tube 1.

I claim:

1. A gas laser comprising a long straight capillary discharge tube having an axis and having end closures constituted to function as mirrors whereof at least one is partially transmissive, or as windows being inclined at the Brewster angle, in combination with a cathode chamber proximate to said tube and removed from said axis, a cathode in said chamber, said tube and chamber being connected next to an end of each, a conduit constituting means effecting said connection, said conduit providing passageway from the chamber to said tube, a portion of the length of said conduit projecting for a distance within said chamber, said conduit having within said distance a restricted orifice, and the size of said orifice being substantially the cross-sectional size of the cross section of the interior of said capillary discharge tube.

2. A gas laser in accordance with claim 1, wherein said orifice opens in a direction longitudinally of said conduit.

3. A gas laser in accordance with claim 1, wherein said orifice opens in a direction transverse to said conduit.

4. A gas laser in accordance with claim 1, wherein said orifice presents a less cross-sectional area than the cross-sectional area of the passageway of said conduit.

5. A gas laser in accordance with claim 1, wherein the dimensions of said discharge tube amount to a length between 10 and 200 centimeters and the inside of the discharge capillary has a diameter from 1 to 6 millimeters, and wherein the length of projection of said conduit into the cathode chamber is within the range of 2 and 3 centimeters, said conduit having an inside diameter from 6 to 8 millimeters.